Figure 1:
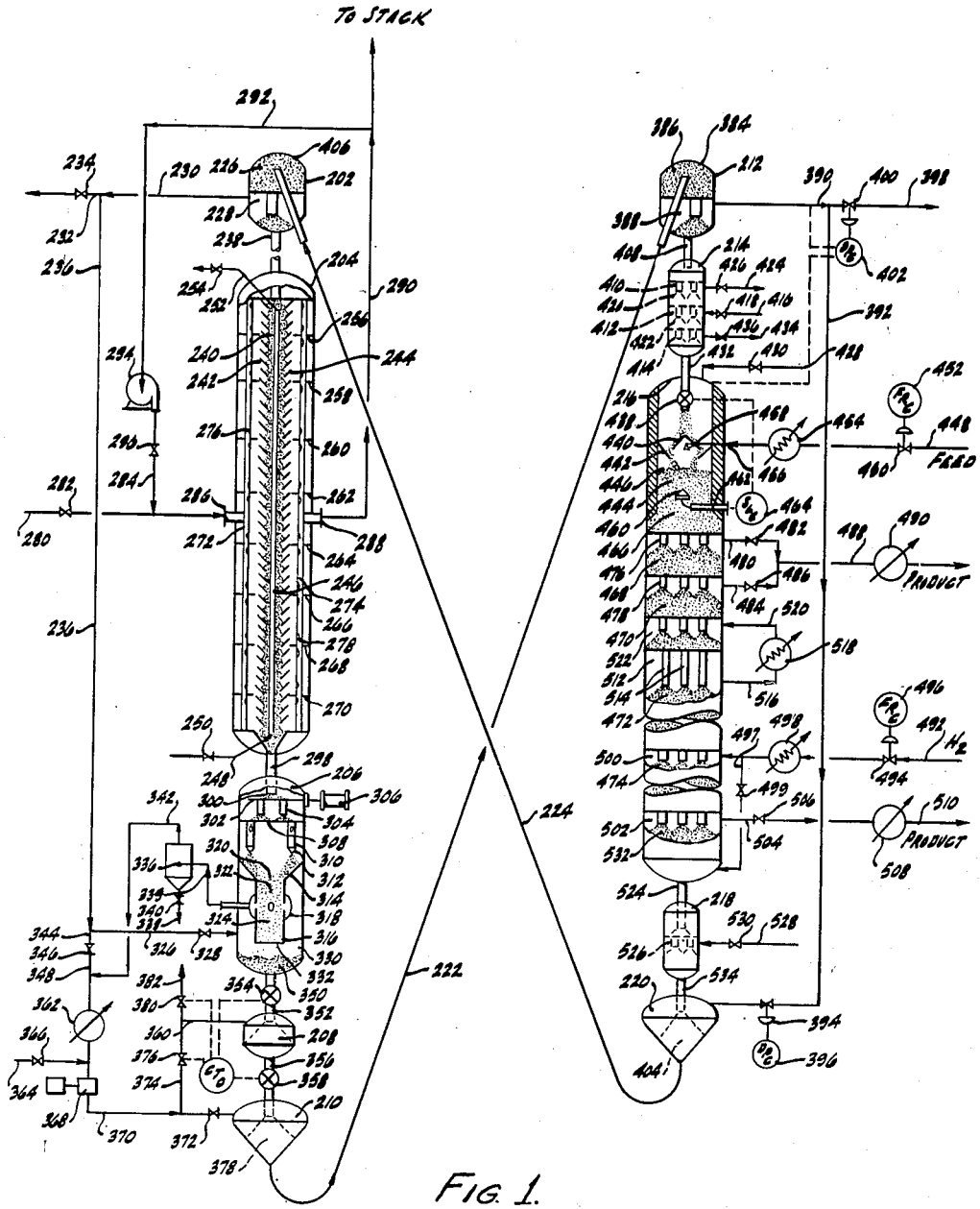

May 13, 1958 W. C. LIEFFERS ET AL 2,834,658
SOLIDS LEVEL INDICATION AND CONTROL SYSTEM
Filed Jan. 20, 1955 2 Sheets-Sheet 1

INVENTORS.
WILLIAM C. LIEFFERS,
FRANK C. RIDDICK, JR.,
ROBERT L. SWITZER,
BY
AGENT.

May 13, 1958 W. C. LIEFFERS ET AL 2,834,658
SOLIDS LEVEL INDICATION AND CONTROL SYSTEM
Filed Jan. 20, 1955 2 Sheets-Sheet 2

INVENTORS.
WILLIAM C. LIEFFERS,
FRANK C. RIDDICK, JR.,
ROBERT L. SWITZER,
BY
AGENT.

United States Patent Office 2,834,658
Patented May 13, 1958

2,834,658

SOLIDS LEVEL INDICATION AND CONTROL SYSTEM

William C. Lieffers, Santa Ana, and Frank C. Riddick, Jr., and Robert L. Switzer, Long Beach, Calif., assignors to Union Oil Company of California, Los Angeles, Calif., a corporation of California Application January 20, 1955, Serial No. 483,122

17 Claims. (Cl. 23—288)

This invention relates to an improved process and apparatus for handling granular solids and in particular relates to the handling of granular solid materials in an improved-solids fluid contact system. Although there are many different kinds of solid fluid contact which are presently effected on a large scale commercial basis in modern industrial operations, the noncatalytic and catalytic hydrocarbon conversion operations in which the hydrocarbon is brought into contact at conversion conditions of temperature, pressure, and composition for a variable reaction time in the presence of catalytic or noncatalytic solid granular contact material are probably typical of most such fluid contact processes. Most of these processes are carried out in the presence of solid contact material which is circulated by any suitable means through a series of contact zones including one or more reaction zones and at least one solid contact material regeneration zone.

In such solids-fluid contacting processes the solid contact material is circulated in a closed cyclic path which includes a series of alternate contacting columns and solid conveyors. The fluid or fluids to be contacted are passed at conversion or reaction conditions through one or more of the contacting vessels to achieve the desired degree of fluid reaction or solid treatment and the effluent product fluid is disengaged from the solids and subjected to further processing or storage. In nearly all such circulated solids processes a spent or deactivated stream of solid contact material is produced, such as the spent hydrocarbonaceous catalyst in hydrocarbon conversion processes. This material is reactivated or regenerated by a further solid-fluid contact in a regeneration column under suitable processing conditions. The regenerated solids continue in the closed cyclic path and are passed back to contact further quantities of the other fluids.

In hydrocarbon conversion processes for example, such as the well known catalytic and noncatalytic processes for hydrocarbon cracking, hydrocracking, coking, desulfurization, denitrogenation, isomerization, polymerization, aromatization, reforming, hydrogenation, dehydrogenation, and others, a solid contact material which is usually but not necessarily a granular catalyst, is circulated through a series of solid-fluid contacting zones including a hydrocarbon conversion zone, a catalyst stripping zone, a catalyst regeneration zone, a catalyst elutriation zone for solids fine removal, and possibly a catalyst pretreatment zone. The foregoing zones are sometimes consolidated in a single contacting column, but in many instances two or more contacting columns are employed standing adjacent each other. In such cases some means necessarily must be employed for granular solids conveyance from one processing step or column to the next.

In the past the granular solids have been conveyed in some processes by means of bucket elevators, but these have been found to be disadvantageous in that the solids conveyance capacity is too low for the physical size of the equipment required; the loading and unloading of the buckets cause excessively high attrition of the granular solids, and because the moving mechanical parts operate at elevated temperatures the lubrication and other maintenance is exceedingly difficult.

Pneumatic or gas lift conveyors have been employed in some of the processes, but these are subject to serious difficulties in that an excessively large volume of conveyance fluid moving at high velocity is required, the granular solids being conveyed impact against each other and against the internal walls of the equipment as they are carried in suspension causing serious solids attrition and equipment erosion, etc.

A very recent and probably the only fundamental modern advance in solids conveyance involves the conveyance or recirculation of granular solids under the influence of a pressure gradient maintained in a conveyance conduit by means of a concurrent conveyance fluid flow at very low velocity and low volumetric rate in which the granular solids move as a continuous dense mass of granular solids having a bulk density substantially equal to that of the granular solids when at rest. There are no moving mechanical parts, the solids move at low velocity under conditions which totally prevent solids to surface impact, and the solids loss due to attrition and equipment erosion have been reduced substantially to zero. Because the granular solids are not dispersed or suspended in the conveyance fluid phase, but are conveyed as a dense mass in plug type flow, extremely high volume or weight rates of solids conveyance are permitted in relatively small sized equipment. For example, synthetic bead cracking catalyst is easily conveyed at rates up to about 38,000 pounds per hour in a conveyance conduit having a minimum inside diameter of 3 inches, and catalyst circulation rates of 600 tons per hour at 950° F. are readily effected in a conveyance conduit having a minimum inside diameter of 14 inches. These remarkably high rates are achieved with the substantial absence of the other problems briefly mentioned above.

In the conveyances of the prior art ordinary separate conveyance fluids are employed and a separate supply of seal fluid such as steam is required to prevent intermixing of the conveyance fluid with the fluids to be contacted. When one or more of the contacting zones in the system is desirably operated at a pressure different from the others, only minor pressure differences were permissible such as about 15 pounds per square inch and this required the use of lengthy sealing legs of the order of 75 feet in height to sustain the pressure differential. This was exceedingly disadvantageous because the mechanical structure necessary to support the solids-fluid contacting equipment frequently exceeded 200 feet and in some instances have approached 300 feet in height.

In addition to the solids transportation problems of the previous processes, the control of the solids recirculation rate and of the indication and control of solids levels or solids inventory in the recirculating system have been exceedingly difficult. One particular phase of this problem involves the control of the rate of removal of granular solids from a given contacting column in which it has been difficult to maintain a uniform solids withdrawal pattern throughout the cross section of the column. A further problem which has only heretofore been partly solved involves the uniform contacting of the fluid with the granular solid contact material. The problem is relatively simple when gaseous fluids are being contacted, but with liquid feeds the problem is exceedingly difficult and no known solution to this problem has yet been devised in which each granular solid particle is contacted with a proportionate part of the total liquid feed. A still further problem which is characteristic of all recirculating solid-fluid contacting processes involves the efficient removal of solids fines from the circulated solids stream. There is invariably a small amount of solids fines present in the recirculated solids stream due inherently to the fact that the granular solids move. Although the dense phase conveyance of these solids eliminates better than 99% of the attrition and erosion which produces these fines, prolonged operation will invariably give rise to the presence of this fine material. The continuous separation of solids fines from a recirculating stream of solids has in the past been accomplished by elutriation of the solids by a fluid flowing at controlled velocity, but invariably some fine solids remained and some solids having average dimensions greater than those desirably removed were also removed with the fines.

The present invention therefore is directed to an improved solids-fluid contacting process of general application wherein substantially all of these problems are successfully avoided. Particularly this invention is directed to an improvement in those catalytic or noncatalytic hydrocarbon contact processes in which a liquid or partially vaporized hydrocarbon is brought into contact with a recirculating stream of solid granular contact material. The present invention is also directed to the specific solids handling technique herein described by means of which the novel and expected results have been obtained.

It is a primary object of this invention to provide an improved solids fluid contacting process in which a novel, highly accurate, and trouble-free system is employed to indicate and control the position of a solids level within the contacting vessel.

It is also an object to provide an improved method for solids level detection and control in any system where a moving bed of solid granular solids is employed.

It is a specific object of this invention to provide an improved solids level indication and control system for processes operating at high temperatures and pressures, particularly in hydrocarbon conversion processes using hydrocarbon feed at least part of which is introduced in liquid form, in which the moving mechanical parts of the solids level detecting system are completely submerged in the moving solids bed thus eliminating contact with the liquid feed and accumulation of heavy hydrocarbonaceous solid deposits on such elements.

It is also an object of this invention to provide an apparatus for solids level indication and control including a vertically movable detecting element disposed entirely within the solids bed and below the solids level to be detected and controlled and which is pivoted at a point apart from the solids bed and which is counterbalanced to provide a substantially increased detection and control range as well as accurate trouble-free indication and control of the level of the moving solids bed.

Other objects and advantages of the present invention will become apparent to those skilled in the art as the description and illustration thereof proceeds.

Briefly the present invention comprises an improved solids fluid contacting process which is particularly well adapted to contact a granular solid contact material at superatmospheric temperatures and pressures with a fluid which is susceptible under the operating conditions to produce heavy solid or semi-solid reaction products in the contacting zone. The process is therefore especially well adapted to the conversion of hydrocarbon materials of relatively high boiling range to produce lower boiling hydrocarbons such as those in the gasoline boiling range at temperatures of the order of 700°–1200° F. at which heavy carbonaceous solid deposits often form. In the present invention the granular solid contact material is introduced in one or more streams into the top of a contacting or reaction vessel and is distributed therein by passing it downwardly over a series of distribution baffles which are disposed around and adjacent a solid cone spray head through which the liquid hydrocarbon feed, for example, is passed. The solids streams are deflected by the baffles downwardly and laterally through the solid cone spray and accumulate within the contacting vessel to form a downwardly moving bed having a substantially flat upper surface or level. The liquid feed is sprayed downwardly from the solid cone spray head directly onto the flat solids level. The individual solid granules thus receive a proportionate amount of the liquid feed in two ways; first, by passing laterally and downwardly through the spray, and second, by impingement of the spray on these particular solid granules while they exist at the flat top surface of the moving solids bed.

The granular solid contact material has a relatively large exposed surface area and often it has internal pores furnishing further area for the accumulation and retention of the liquid which contacts it. In the process of this invention, as applied to hydrocarbon conversion and other chemical reactions, the granular solid is preferred to have such adsorptive properties and in addition desirably has catalytic properties which increase the rate of the desired reaction.

The individual rates of feed and granular solid introduced into the contacting zone are controlled with relation to each other so that all of the liquid phase of the feed stream remaining after contact of the feed with the solids is retained and held by wetting and/or adsorptive or other forces by the granular solids and any vapor fraction passes downwardly through the liquid-containing solids. With such control there is no net flow of liquid feed downwardly through the interconnected interstices of the moving granular solids bed with the vapor or downwardly along the inner surfaces of the contacting column.

The moving solids bed containing the feed liquid is maintained at conversion conditions of pressure and temperature by any suitable means and the reaction of the feed liquid progresses as it is carried downwardly by the solids bed through the conversion or reaction zone. The products of the reaction are evolved into the vapor space between individual solid granules as they are formed. These higher volatility products, together with any vapor fraction of the feed and any vapor formed by vaporization of feed liquid on contact with the solids, are swept rapidly without substantial further reaction from the reaction zone by maintaining a flow of sweep or purge gas through the interconnected interstices of the solids bed, and by controlling the purge gas rate at a sufficiently high value to prevent any substantial further reaction of these vapors.

This process, as above indicated, is particularly successful in the conversion of high boiling hydrocarbon fractions into lower boiling products of increased volatility. In such processes the sweep gas preferably comprises hydrogen, although the light hydrocarbon gases such as methane, ethane, ethylene, and the like or mixtures thereof with hydrogen may be employed. The product removed in this manner from the reaction zone is cooled and condensed or otherwise fractionated and the light sweep or purge gas may be recovered and recycled.

In the present invention the actual position of the flat solids level referred to above is exceedingly important, principally because the cross sectional area of the solid cone spray increases with distance from the spray head and it is desirable when a single spray is used that the area of the spray at the point at which the liquid contacts the flat solids level be substantially the same as and coincide with the cross-sectional area of the solids level. In this manner each granular solid particle is contacted by and retains a uniform proportion of the feed introduced.

In hydrocarbon conversion processes in particular and in many other contacting processes in general, adverse reactions may occur if the liquid feed contacts the internal surfaces of the contacting column or other structural elements maintained therein. With hydrocarbon feed stocks, heavy semi-solid hydrocarbonaceous materials referred to generally as coke rapidly form and accumulate at the elevated operating temperatures on these surfaces. Such deposits interfere with solids flow as well as with any of the conventional apparatus employed for detecting and controlling the position of the solids level. Such devices are soon rendered inoperative if such accumulations are permitted to form.

The present invention avoids these problems entirely by insuring contact of the liquid feed only with the granular solid contact material and by employing a novel method and apparatus for detection and control of the position of the flat solids level. The latter system involves the use of a solids level detecting element which is completely submerged by the downwardly moving solids bed and it has been found possible to eliminate any movable solids level detecting element which penetrates the solids level or any part of which exists in the region above the solids level so that it can be contacted directly by the feed liquid. The moving bed continuously wipes the external surfaces of the detecting element, the element is not subject to accumulations of foreign matter tending to incapacitate it, it has been operated successfully over extended periods at very elevated temperatures in the presence of fluid materials which otherwise form the foreign solid deposits referred to above, and the system accurately indicates and permits control of the solids level over extended ranges of position.

The improved solids level control device consists of a vertically movable detecting element disposed in contact with and submerged by the downwardly moving bed of granular solids. The element is placed at a point below the lowest expected or desired solids level and the element performs satisfactorily when submerged by as little as one inch or as much as 15 inches of solids, these distances varying as functions of the relative diameter of the indicating element and the width of the moving solids bed at that depth, and in general using a detecting element whose diameter is of the order of 15% of the solids bed diameter, solids depths above the element of from 0% to as much as 200% of the diameter are readily detected and controlled.

The detecting element is supported by means of a lever arm which extends from the element in a more or less horizontal direction through the wall of a contacting vessel into an external housing. A lever arm housing is disposed around the upper surface of the lever arm and serves to divide the solids flow downwardly around the arm so that they exert no interference with the indication of solids level. The lever arm is pivotably supported at a point adjacent the vessel wall and within the external housing by means of a knife-edge and block support disposed therein. In one particularly desirable modification of this invention the lever arm and detecting element are counterbalanced by means of an adjustable mass of high density material or by an adjustable spring loading at a point beyond the pivot point from the level detecting element for reasons described below.

Integrally connected at substantially right angles to the lever arm and at a point substantially coincident with the pivot point is a torque tube assembly consisting of an outer torque tube and a concentrically disposed torque tube rod therein. The torque tube and rod are integrally connected to each other at their ends which also connect to the lever arm adjacent the pivot point. The opposite end of the torque tube is rigidly connected to prevent rotation thereof while the corresponding end of the torque tube rod is provided with a bearing and is left free to rotate. The integral connections of the torque tube ends provide a pressure resistant seal and also provide a restoring force for the angular movements of the lever arm about the pivot point in response to changes in solids level. Such solids level changes cause changes in the gravitational and frictional forces acting on the detecting element. These changing forces cause vertical deflections of the lever arm about the pivot point and these deflections in turn cause changes in the torsional or rotational deflection of the torque tube and the torque tube rod which are a function of the changes in solids level. A preliminary calibration of the torsional deflections with changes in solids levels determines the function. Therefore the angular movement of the torque tube rod serves as a direct indication of solids level variations and may be connected to actuate a variable resistance or a throttle valve employed respectively in an electrically or pneumatically operated control instrument which in turn is adapted to correct the detected deviation in the solids level by varying the solids flow rate.

The torque tubes employed in the present invention are about 10–20 inches in length, 0.25 to 0.50 inch in diameter, and may be constructed of materials such as Inconel, stainless steel, and others which are suitable to resist the conditions of temperature, pressure and composition of the materials to which they are exposed. The permissible angular deviation of the torque tube is generally limited to less than about 10 degrees so as to prevent causing a permanent deformation of that specific material. Under very high operating temperatures this angle may sometimes be reduced to as low as about 2 degrees. This small deflection often is used up in merely supporting the lever arm and indicating element. But with the counterbalance, the device can be operated according to this invention at zero stress in the torque tube even at extreme temperature conditions.

In one preferred modification of this invention the lever arm is counterbalanced sufficiently to cause a reverse angular deviation not exceeding the maximum value in the torque tube at "zero" solids level, e. g. when there are no solids above the detecting element. In this manner, successively higher solids levels will successively reduce the reverse or negative angular deflection to zero (moment of detecting element equals moment of counterbalance) and further increases will reflect a positive deviation of up to the maximum allowable value. In this way the maximum torsional deflection of the torque tube rod is materially increased even at high operating temperatures and improved accuracy of level measurement and an increased range of solids level may be controlled under conditions in which the presently available devices are inoperable.

The solids level indicating and control method and apparatus of this invention has proven extremely effective over prolonged periods in the indication and control of solids levels in hydrocarbon conversion processes employing hydrocarbons fed in the liquid phase and handling solids at temperatures as high as 1200° F. It is to be understood however that the same or similar advantages may be obtained in any process in which moving beds of granular solids are employed.

The subsequent description is conducted in terms of a specific process in which a constant or accurately predetermined solids level must be maintained. The illustrative process is one in which a heavy gas oil hydrocarbon material is introduced at least partly in the liquid phase into contact with a recirculating stream of very hot granular hydrocarbon conversion catalyst and in which the gas oil is sprayed directly onto the upper flat level of the catalyst bed. No liquid hydrocarbon phase exists in the contacting zone apart from the material retained on the solid granules and therefore the relatively high solids rates are required. Catalyst to liquid oil ratios of from about 5.0 tons per ton to as high as 50 tons per ton or more are characteristic of this process. When the feed hydrocarbon is partly vaporized and/or additional vaporization occurs on contact with the solids, the minimum value of the catalyst to oil ratio is proportionately reduced, and a value of about 0.5 ton per ton is characteristic when 10% of the total feed remains unvaporized after contact with the solids. When applied to the conversion of gas oils at rates of about 15,000 barrels per day and with gravities of about 25° API, the required catalyst recirculation rate is about 987 tons per hour for a catalyst to oil ratio of 10.0. With higher catalyst to oil ratios and the same feed rate, the catalyst circulation rate rises in proportion to values considerably above 987 tons per hour figure given. It is only through the use in the present invention of a novel and recently developed system for solids transport that such catalyst circulation rates can be successfully maintained in reasonable size apparatus and for practical periods without the otherwise prohibitive attrition and equipment erosion.

The granular solids are conveyed in the form of an elongated continuous mass of compact or dense solids having a bulk density substantially equal to the static bulk density of the solids when at rest. This bulk density is substantially the same as that of a downwardly moving compact bed of the solids passed by gravity through a contacting or other vessel. This type of solids conveyance through an elongated conduit or conveyance zone is effected by maintaining a dense accumulation of solids to be conveyed submerging the inlet opening of the conveyance zone. This is accomplished by applying solids to the accumulation at substantially the same average rate as the rate that the solids are conveyed through the conveyance zone. The granular solids are maintained during conveyance in the dense compact form briefly described by applying a solids flow restriction against the stream of compact solids discharging at the outlet of the conveyance zone. This is effected by discharging the solids in any direction from the conveyance zone outlet against a transverse surface, such as a separate thrust plate or the wall or the roof of a solids receiving chamber, which surface is disposed adjacent the outlet opening of the conveyance zone at a distance between about 0.1 and 2.0 conveyance zone outlet diameters away from the outlet. The mass of granular solids discharged from the outlet then flows downwardly by gravity surrounding the outlet and extending downwardly to a contacting column in which the granular solids are employed. The solids flow restriction at the outlet may be also accomplished by discharging the dense mass of solids from the outlet in substantially any direction into a solids receiving chamber in which a mass of discharged solids is maintained which submerges the outlet opening of the conveyance conduit. The discharge direction may be upwardly into such a bed of solids, or horizontally, or downwardly, and in which latter case the submerging bed of solids takes the form of a conical pile whose apex extends upwardly and into the outlet opening. In any event, the flow of conveyed solids in the form of a dense compact mass is restricted at the outlet opening which prevents the granular solids from being dispersed and maintains them at the outlet and throughout the conveyance zone as an elongated dense moving mass.

This dense mass of granular solids is caused to move by passing a concurrent flow of a conveyance fluid through the conveyance zone in the desired solids flow direction. This fluid is introduced at the conveyance zone inlet at a high pressure relative to the pressure maintained at the conveyance zone outlet where the conveyance fluids is disengaged from the discharged dense mass of conveyed solids. This over-all pressure differential generates and maintains the concurrent flow which passes through the serially interconnected interstices of the dense solids mass generating therein a pressure gradient having a value defined by the following equation:

$$\frac{dp}{dl} \geq \rho_s \cos \theta \quad (1)$$

in which $$\frac{dp}{dl}$$

is the pressure gradient at any point in the conveyance zone in pounds per square foot per foot, $\rho_s$ is the static bulk density of the solids when at rest in pounds per cubic foot, and $\theta$ is the angular deviation of the conveyance direction measured from a vertical upward reference axis. The value of $$\frac{dp}{dl}$$

in Equation 1 therefore is a minimum value determined solely by the bulk density of the solids being conveyed and the conveyance direction. When the conveyance fluid flows at a rate sufficient to generate a pressure gradient defined by Equation 1, the forces of gravity acting on the granular solids are neutralized and a slight increase in the pressure gradient effected by increasing the conveyance fluid flow is also sufficient to overcome forces of friction of the inner surfaces of the conveyance zone walls on the solids. This permits the solids to move upwardly as a continuous dense mass so long as solids are supplied to the aforementioned accumulation at the conveyance zone inlet and are removed at substantially the same rate from the mass of discharged solids at the conveyance zone outlet.

From the foregoing considerations and Equation 1 it can be seen that the over-all pressure differential ΔP required to operate this type of conveyance when conveying any specfic type of granular solids having a bulk density of $\rho_s$ through a conveyance zone having a length L in feet in a direction of angular deviation $\theta$ from a vertical upward reference axis is given as follows:

$$\Delta P \geq \rho_s \cos \theta L \quad (2)$$

in which ΔP is the over-all pressure differential in pounds per square feet between the inlet and outlet of the conveyance zone. The actual operating pressure differential will be slightly greater than the value given by Equation 2 because of the frictional forces previously mentioned.

The degree to which the actual pressure gradient $$\frac{dp}{dl}$$

and the over-all pressure ΔP must exceed the minimum values defined respectively by Equations 1 and 2 depends to some extent upon the nature of the granular solids and the nature of the internal surface of the conveyance zone. Actual experience with the type of granular solids conveyance indicates that the minimum operating values of pressure gradient and over-all pressure differential usually are of the order of 10–50% in excess of the minimum values defined by Equations 1 and 2. It should be understood however that pressure gradients and over-all pressure differential greatly in excess of these minimum values may be generated and maintained in this type of conveyance zone when necessary or desirable and they have no noticeable effect upon the density of the granular solids being conveyed or the rate of solids conveyance. The density of the granular solids being conveyed is substantially constant, subject to slight changes due to rearrangement in granular solid packing geometry, and thus is independent of the actual operating pressure gradient or over-all pressure differential and independent of the granular solids conveyance rate. The conveyance rate is solely determined by the rate at which the granular solids are removed from the outlet of the conveyance zone and, of course, to maintain the dense moving mass of granular solids, granular solids to be conveyed must be conveyed to the accumulation of solids at the inlet at this same rate.

Figure 2:
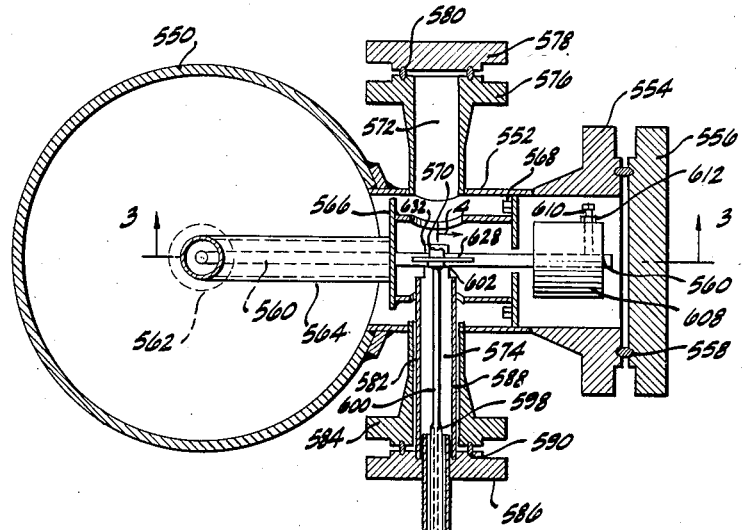
Figure 2:
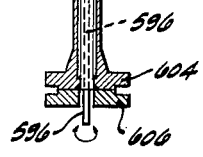
Figure 4:
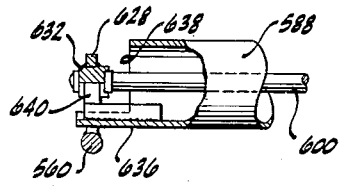
Figure 3:
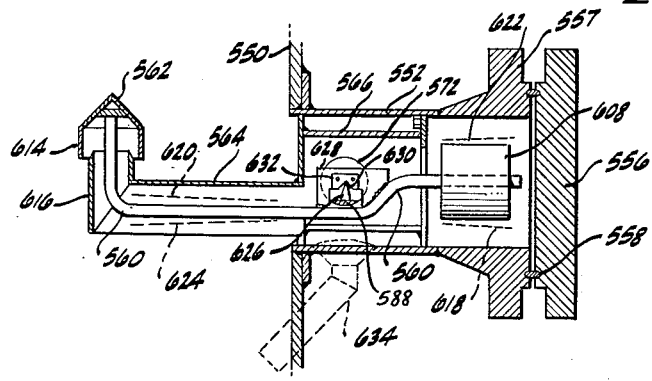

The present invention may be more readily understood by reference to the accompanying drawings in which:

Figure 1 is a schematic flowsheet of a hydrocarbon conversion process employing the principles of the present invention and showing the essential vessels in cross section, Figure 2 is a detailed plan view in cross section of the elements of the solids level indication and control apparatus of this invention, Figure 3 is a detailed elevation view in cross section of the apparatus shown in Figure 2, and Figure 4 is a detailed view of the knife-edge pivot used in the apparatus of Figures 2 and 3.

Referring now more particularly to Figure 1, a schematic flow diagram of the present invention is shown in which granular solids are recirculated through two contacting columns and in which the structural details of the individual apparatus structures are shown. Figure 1 will be described in terms of a specific solids-fluid contacting process, namely the treatment of a hydrocarbon feed stock, at least partly in the liquid phase, boiling above about 400° F. with a catalytic cracking catalyst in the presence of hydrogen to produce a cracked and coked hydrocarbon product consisting substantially entirely of gasoline and lighter hydrocarbons.

The apparatus of the present invention includes first solids fluid separator 202, catalyst regeneration vessel 204, regenerated solids feeder and elutriation vessel 206, solids pressuring vessel 208 and first induction vessel 210. The foregoing elements comprise a series of superimposed vessels constituting one of the columns of the present invention. The second column comprises second solids-fluid separator vessel 212, upper sealing vessel 214, reaction vessel 216, lower sealing vessel 218 and second induction vessel 220. The bottom of the first contacting column is connected to the top of the second contacting column by means of first conveyance conduit 222. Second conveyance conduit 224 communicates the bottom of the second contacting column with the top of the first contacting column to complete the closed cyclic solids path.

In the present example the solid granular contact material comprises a silica alumina synthetic bead cracking catalyst containing between 0.1% and 0.2% of chromium oxide by weight to facilitate spent catalyst regeneration. The circulation rate in the present example is 800 pounds per hour. The feed rate is 8.6 barrels per day of a gas oil fraction including 5.7 barrels per day of recycle oil boiling above 400° F. and 2.9 barrels per day of fresh gas oil feed having the following properties:

TABLE I

*Properties of fresh feed stock*

| | |
|---|---|
| Boiling range, °F | 550°–760° (90% pt.) |
| Gravity, °API | 23.5 |
| Sulfur weight, percent | 1.15 |
| Characterization factor | 11.5 |

The catalyst to reactor charge oil ratio on a weight basis is 6.5 to 1.

The spent catalyst containing about 0.50% by weight of a hydrocarbonaceous deactivating deposit generally referred to as coke is discharged as a compact moving bed from second conveyance zone 224 into first solids separator 202. The spent solids bed 226 passes downwardly by gravity through fluid disengaging zone 228 from which the totally depressured conveyance is removed at a pressure of 350 p. s. i. g. through line 230. A portion thereof may be removed if desired through line 232 controlled by valve 234. The remaining portion of conveyance fluid, which comprises an inert flue gas is recirculated in the conveyance fluid recycle stream through line 236.

The spent granular solids pass downwardly through transfer line 238 for introduction into the upper part of catalyst regenerator 204. The spent catalyst passes downwardly therethrough as moving bed 240 confined between louvered walls 242 and 244, the louvers sloping downwardly and inwardly confining the catalyst therebetween and providing a low resistance transverse flow path for the regeneration fluid. Extending longitudinally through the downwardly moving bed of spent catalyst is heat exchange zone 246 through which a fluid heat transfer medium is passed at a rate sufficient to maintain the maximum temperature of regeneration at values well below those at which the catalyst is thermally damaged. The heat transfer medium may be gaseous or liquid, and if gaseous it may be passed either concurrently with or countercurrently to the downwardly moving solids bed. If liquid, it is preferred that it be introduced in line 248 controlled by valve 250 for upward passage through heat transfer zone 246 and removal through line 252 controlled by valve 254. In the present example the cooling medium was low pressure steam passed through the regeneration zone so that the maximum temperature was successfully maintained at about 1150° F.

The spaces on either side of the downwardly moving bed 240 of spent cracking catalyst comprise an inlet and outlet manifold zone for the regeneration fluid. This space is subdivided into a plurality of superimposed inlet and outlet manifold zones by means of a series of vertically spaced horizontal baffles 256, 258, 260, 262, 264, 266, 268 and 270. In the present structure, the louvered walls 242 and 244 extend substantially entirely across vessel 204 along lines paralleling the diameter of the column. Extending upwardly through column 204 on each side of the louvered walls are inlet and outlet header zones 272 and 274 respectively adapted to introduce and remove the regeneration fluid from regenerator vessel 204. These header zones in the present example comprise an elongated conduit closed at its ends and provided with one or more apertures 276 and 278 respectively by means of which the fluid passes from inlet header 272 into each of the inlet manifold zones, transversely through the downwardly moving catalyst bed 240, into the corresponding outlet manifold zone and then into outlet header 274.

Fresh regeneration fluid consisting of air is introduced at a rate of 1000 s. c. f./hr. through line 280 controlled by valve 282 and is mixed with an optional recirculation of spent regeneration gas flowing through line 284. This regeneration gas is introduced through inlet 286 into inlet header 272, is collected in outlet header 274, and removed therefrom through outlet 288 and through line 290 to a stack. If desired a portion of this spent regeneration gas may be recirculated through line 292 by means of blower 294 and line 284 controlled by valve 296 for recirculation with the fresh regeneration fluid into the inlet 286 of the regenerator column 204.

The regenerated catalyst is removed from regenerator 204 at a temperature of about 950° F. containing approximately 0.05% carbon by weight. It is conducted downwardly as a moving bed through transfer line 298 and is introduced into the top of regenerated catalyst feeder and elutriation vessel 206.

Vessel 206 is roughly divided into two portions, the upper portion containing especially designed catalyst feeding or metering device containing a surge volume, and a lower catalyst elutriation device for effecting the continuous separation of a very small quantity of catalyst fines from the recirculating catalyst stream. The catalyst feeding and surge device cooperates actively with the elutriation section and provides for the latter section a continuous metered stream of solids at a constant predetermined volumetric rate from an intermittently flowing source of regenerated solids.

Transfer line 298 extends downwardly into the upper part of vessel 206 and terminates in outlet opening 300. Disposed transversely in the upper part of vessel 206 is reciprocable solids feeder tray 302 with a pair of open ended dependent tubes 304 extending downwardly therefrom. These are the feeder tubes having a known volume and defining the columetric capacity of the solids feeder. Motive means 306 is provided for reciprocating tray 302 so as to align alternately one or the other of feeder tubes 304 with opening 300 of solids transfer line 298. Disposed immediately below feeder tubes 304 is a lower stationary tray 308 from which depend a plurality of surge tubes 310. These surge tubes are provided at their lower outlet openings with a solids flow restriction 312 which reduces the gravity discharge rate of the tubes to between about 1% and 30% of their normal gravity flow rate. Motive means 306 and reciprocating tray 302 alternately aligns one of the feeder tubes with opening 300 while sealing the lower opening of the same feeder tube against the upper surface of tray 308. At this same time the other feeder tube is aligned with one of the surge tubes thereby discharging its solid contents into the surge tube. Reciprocation of tray 302 intermittently removes incremental volumes of solids from opening 300 and discharges them into surge tubes 310. Because of the outlet restrictions 312, which may be made variable by means of any sort of a variable area orifice structure, a continuous discharge of solids from surge tube 310 is provided at an instantaneous rate which is equal to the average rate at which the feeder tubes charge solids thereto.

The solids discharging from surge tubes 310 pass downwardly and are directed by means of funnel or other appropriate member 314 into the upper portion of an elutriation chamber 316 having an intermediate disengaging means 318 for the removal of suspended solids fines in the elutriation gas. Between disengaging zone 318 and the upper solids inlet 320 is disposed a section of elutriation conduit 316 which is a solids acceleration zone 322 in which the granular solids are allowed to accelerate so that the larger particles attain at least a substantial part of their terminal velocity under the influence of gravity alone and in the absence of any simultaneous flow of fluids. The effect thus achieved has been found to include the substantially complete elimination of larger than desired sized particles in the elutriation gas suspension of fines. This is apparently due to the fact that the solids of undesirable size reach their terminal velocity very rapidly whereas the larger sized particles require an appreciable acceleration time. When the unaccelerated solids are dropped into an elutriation zone and a countercurrent flow of elutriation fluid is maintained, that fluid will suspend and remove the fine solids of low velocity as well as larger solids whose velocity is low because the solid has not accelerated to attain a substantial part of its terminal velocity.

In the present invention the solids are allowed to gravitate through acceleration zone 222 to form a shower having a density of the order of from 0.5% to 30% by weight of the maximum density in pounds per cubic foot of the dense packed solids when at rest. The substantially fully accelerated solids then pass downwardly into elutriation zone 324 in which they are contacted by a countercurrent flow of elutriation gas introduced through line 326 controlled by valve 328 into elutriation gas engaging zone 330 surrounding elutriation and acceleration conduit 316. This gas passes upwardly through lower outlet 332, decelerating and suspending the finer sized solids, and decelerate but not sufficient to suspend the larger solids which move substantially at their terminal velocity. The suspension of solids fines is removed from conduit 316 through disengaging zone 318 and flows through line 334 into separator 336 in which a centrifugal or other appropriate separation of the suspended solids fines is effected. The solids fines are removed through line 338 controlled by valve 340 and the fines free elutriation fluid is removed through line 342.

In the present instance the elutriation conduit 316 was 24 inches long, 2.0 inches in inside diameter, and the disengaging point was located 10 inches from the upper inlet opening of conduit 316. This was sufficient under the conditions of operation to permit the largest sized particles to attain at least 50% of their terminal velocity. Without the acceleration zone 322 the fine solids smaller than 20 mesh were contaminated with as much as 25% of larger sized solids which were not desirably removed. However with the acceleration zone, the fine solids are found to contain less than about 1% of the larger solids desired in the recirculating solids stream.

In the present application of the process of this invention the elutriation fluid comprises spent regeneration gas at 950° F. introduced into the elutriation zone through lines 236 and 326 at a rate of 1000 s. c. f./hour. The remaining spent regeneration gas flows on through line 344 controlled by valve 346 which provides a pressure differential sufficient to force the elutriation fluid through the elutriation zone. The fines free elutriation fluid and the remaining portion of conveyance fluid recycle are joined in line 348 and treated as subsequently described. The elutriated fines free catalyst collects as a solids bed 350 in the bottom of feeder and elutriation vessel 208. These solids exist at a pressure of about 350 p. s. i. g. and are to be delivered to reaction column 216 at a pressure of about 400 p. s. i. g.

To accomplish this, one or more solids pressuring vessels 208 are provided in solids receiving relation to solids bed 350 and in solids delivery relation to first induction vessel 210. Transfer line 352 controlled by valve 354 provides a solids inlet to vessel 208 and line 356 controlled by valve 358 provides a solids outlet therefrom into induction vessel 210. With pressure vessel 208 at a pressure of 350 p. s. i. g. valve 354 is opened and a charge of solids passes by gravity through line 352 into vessel 208. Valve 354 is then closed, and a fluid under pressure is admitted through manifold 360 raising the pressure of the fluids in the interstices of the solids in vessel 208 to a pressure of 450 p. s. i. g. In the present modification this fluid comprises compressed flue gas as part of the conveyance fluid recycle. This conveyance fluid is cooled if necessary in cooler 362, is mixed with additional conveyance fluid if necessary flowing through lines 364 controlled by valve 366, is compressed to a pressure of 450 p. s. i. g. in conveyance fluid recycle compressor 368, and is introduced through line 370 controlled by valve 372 into the high pressure point of the conveyance fluid path according to this invention. A part of this high pressure fluid flows through line 374 controlled by valve 376 and through manifold 360 as the high-pressure catalyst pressuring fluid.

With the catalyst pressured to 450 p. s. i. g., valve 376 is closed, valve 358 is opened and the pressured solids discharge into and are added to solids accumulation 378 in first induction chamber 210. Valve 358 is then closed, valve 380 is opened for a sufficient period to vent pressuring vessel 208 through lines 260 and 382 to a pressure of 350 p. s. i. g. At this time valve 354 is reopened to admit sufficient solids to be pressured and the cycle is repeated at a rate sufficient to pressure the regenerated catalyst at a rate equal to that at which catalyst is withdrawn by means of the reciprocating tray feeder described above.

The 450 p. s. i. g. conveyance fluid and solids are depressured concurrently through first conveyance zone 222 in the form of a dense upwardly moving bed of compact solids as described above. The solids discharge against the upper surface 384 of second solids-fluid separator chamber 212 and pass downwardly as a moving bed 386 through conveyance fluid disengaging zone 388. The overall pressure differential in conveyance zone 222 is about 50 p. s. i. and accordingly the conveyance fluid pressure in zone 388 is about 400 p. s. i. g. The major portion of the conveyance fluid is removed through line 390, passed through by-pass line 392 at a rate controlled by valve 394 in accordance with differential pressure controller 396, and is introduced at substantially the same pressure into second induction vessel 220. If desired, a minor portion of the conveyance fluid is removed from line 390 through line 398 at a rate controlled by valve 400 in accordance with differential pressure recorder controller 402 and either discarded or returned through line 364 to conveyance gas compressor 368.

The major portion of conveyance fluid engages with accumulation of spent catalyst 404 and they depressure concurrently as an upwardly moving compact mass through second conveyance conduit 224 to a pressure of about 350 p. s. i. g. and are discharged against upper surface 406 of first solids-fluid separator chamber 202 to complete the catalyst and conveyance fluid cycle.

It is apparent from the description thus far that two closed cyclic paths are involved in the process of this invention, one involving the solids and the other involving the conveyance fluid. The two paths coincide in the conveyance zones 222 and 224 and separate in the two principal contacting columns. The solids flow downwardly by gravity through the columns while the conveyance fluid is disengaged from the solids, by-passes from the solids inlet point to the solids outlet point of the column, and is then reengaged with the solids for the second conveyance step. The by-pass lines are lines 236 and 392.

The hot regenerated catalyst passing downwardly as moving bed 386 flows through transfer line 408 into upper seal vessel 214. Herein a special mechanism and process for isolating the conveyance fluid flow from the hydrocarbon fluids in reaction vessel 216 are employed. Regenerated hydrocarbon cracking catalyst is exceedingly sensitive to the deactivating effects of steam. Steam is desirable as a sealing medium because of its ease of separation from hydrocarbon fluids through cooling and condensing steps and its relative cheapness. In the present invention steam may be employed with substantially no deleterious deactivating effects in upper sealing vessel 214. This vessel is provided with upper disengaging zone 410, steam engaging zone 412, and lower disengaging zone 414. Seal steam is introduced through line 416 controlled by valve 418 into engaging zone 412 wherein it divides into a first portion which passes upwardly countercurrent to the regenerated catalyst through a small catalyst bed 420 into upper disengaging zone 410, and a sceond portion which passes downwardly concurrently through small catalyst bed 422 into lower disengaging zone 414. The first portion combines with a minor portion of conveyance fluid flowing concurrently with the catalyst through transfer line 416 and is removed therefrom from line 424 controlled by valve 426. The second portion of steam joins in lower disengaging zone 414 with a portion of a blanket stream of hydrogen introduced through line 428 at a rate of 500 s. c. f./hour controlled by valve 430 and which flows upwardly countercurrent to the catalyst through transfer line 432. This lower seal stream is removed through line 434 controlled by valve 436.

Zones 410, 412 and 414 are placed as close together as possible, preferably with not more than a few inches of clearance therebetween in which catalyst beds 420 and 422 exist. In this way a very small amount of seal steam serves to prevent intermixing of the conveyance fluid with the hydrogen and yet the catalyst is in contact in vessel 214 with steam for only an exceedingly short period of time. In the present invention this time is about 50 seconds and results in no detectable deactivation of the catalyst. The regenerated catalyst, sealed and stripped of conveyance fluid as above described, drops by gravity through transfer line 432 at a rate controlled by valve 438 into the top of reaction vessel 216 for downward passage therethrough in contact with the hydrocarbon to be converted.

Reaction vessel 216 is of special design to provide for a completely uniform contacting of the entering regenerated catalyst with a hydrocarbon feed which is at least partly in the liquid phase whereby the liquid is adsorbed or otherwise collected on the surface and in the pores of the adsorbent cracking catalyst and carried therewith by gravity downwardly through the various individual zones of reaction column 216. The relative catalyst and feed rates are controlled so that no downwardly flowing liquid phase of hydrocarbon exists through the downwardly moving catalyst bed. The catalyst bed is maintained at hydrocarbon conversion conditions of pressure, temperature and composition to effect a catalytic cracking of the adsorbed liquid hydrocarbon in the presence of a flow of hydrogen to produce hydrocarbons of lower molecular weight and greater volatility and having boiling points of below 400° F. These higher volatility hydrocarbons are evolved into the vapor phase from the catalyst bed at any point where they are formed and are swept rapidly without any further substantial reaction from the reaction zones by means of a current of hydrogen. The catalyst flow is continued and the reaction temperature is maintained so that at the bottom of the column the spent catalyst contains only a deposit of coke in which the carbon to hydrogen ratio is very high, of the order of 20 to 1. The residence time of the catalyst in the reactor, the operating pressure, and the operating temperature are thus controlled so as to convert substantially all of the adsorbed liquid hydrocarbon feed into volatile products boiling below about 400° F. and a relatively minor fraction of the feed consisting of this high molecular weight deactivating deposit on the catalyst.

The sealed, regenerated catalyst passes downwardly concurrently with a blanket stream of hydrogen onto inner or primary conical baffle 440 deflecting the catalyst outwardly and downwardly against the inner surface of outer or secondary truncated conical baffle 442. The catalyst is deflected then downwardly to form the downwardly moving catalyst bed 444 which passes completely through reaction vessel 216. The purpose of the two conical distributing baffles 440 and 442 having the shape and relative disposition shown is to form and maintain a substantially flat upper solids surface 446 in the upper portion of vessel 216 on which the partially preheated feed hydrocarbon, at least partly in the liquid phase, is sprayed.

The gas-oil feed is pumped through line 448 at a rate of 8.6 barrels per day controlled by valve 450 in accordance with flow recorder controller 452. The oil is heated to a temperature of about 400° F. in preheater 454 and is then passed through inlet 456 provided with solid cone spray 458 which is directed downwardly from a point immediately below upper conical baffle 440. The downwardly directed spray is so disposed that the catalyst deflected from the lower truncated conical baffle 442 passes in various directions through the solid cone spray and catalyst level 446 is so controlled that the upper exposed area of the catalyst bed is substantially equal to and preferably slightly greater than the cross-sectional area of the solid cone spray at the point where the spray contacts upper catalyst level 446.

It has been found that the relative disposition of baffles 440 and 442 and solid cone spray 458 results in the contacting of every single regenerated catalyst particle with a substantially uniform quantity of liquid hydrocarbon feed which in turn results in uniform treatment of the feed hydrocarbon and of the catalyst at all times.

The position of solids level 446, which also indicates the inventory of catalyst in the system, is detected by a submerged solids level indicating element 460 disposed below solids level 446 and effected by the gravitational and frictional forces of the downwardly moving catalyst bed 444. These forces are determined by the depth of catalyst bed above element 460. It is connected by means of mechanical linkage 462 to solids level controller 464 which in turn actuates solids inlet valve 438 to maintain the solids level 446 at the desired distance below the feed inlet sprays. The conventional solids level indicators which detect the position of the upper solids level 446 with an element penetrating the solids level cannot be used in the present type of process since exposed metal surfaces tend to accumulate a heavy deposit of coke which soon renders inoperable such detecting elements.

The improved submerged element 460 serves to detect changes in solids bed level of up to about 1.5 feet in a column 1.5 feet in diameter using a detector element 3 inches in diameter. This detecting element thus can detect solids level changes about equal to the column diameter with an element whose diameter is one-sixth of that diameter. It does not accumulate the hydrocarbon deposit, and is capable of long continued operation.

The catalyst at a temperature of 1050° F. passes through line 432 as described. An initial vaporization of the more volatile components of the feed takes place at solids level 446 and this vapor, together with any vapor fraction of the feed as introduced, passes downwardly through first reaction zone 460 concurrently with the downwardly moving bed of catalyst containing the liquid fraction of the feed adsorbed thereon. The vapor phase flow is concurrent with the major portion of blanket hydrogen introduced as described through line 428.

The moving bed of cracking catalyst containing the adsorbed liquid phase hydrocarbon passes downwardly through first reaction zone 466 concurrently with the mixture of blanket hydrogen and the vapor phase hydrocarbon. During the downward passage continuing reaction of the liquid phase hydrocarbon causes the evolution of additional volatile hydrocarbons which join the vapor phase. A plurality of subjacent serially connected reaction zones are provided for the continued reaction of the adsorbed phase hydrocarbon. In Figure 1 these additional reaction zones are indicated as second reaction zone 468, third reaction zone 470, fourth reaction zone 472, and fifth reaction zone 474. The first, second, and third reaction zones are separated from one another by first and second effluent disengaging zones 476 and 478 from which the volatile hydrocarbons in the vapor phase and the hydrogen recycle stream are withdrawn through lines 480 controlled by valve 482 and line 484 controlled by valve 486. If desired any greater number of concurrent reaction zones similar to zones 466 and 468 may be employed and in each case provision is made for the disengaging of the hydrocarbon vapor from the solids and for the removal of such material to prevent further reaction. The vapor so removed is passed through line 488 into product cooler 490 in which it is passed into a conventional vapor liquid separator. The liquid is sent to storage or further processing facilities not shown and the vapor phase is fractionated to recover light hydrocarbons leaving a hydrogen rich gas which is recirculated to the reactor as the hydrogen sweep gas and blanket gas introduced thereto.

The principal portion of this hydrogen is introduced as the sweep gas into the lower part of the column through line 492 at a rate of 1500 s. c. f./hour controlled by valve 494 in accordance with flow recorder controller 496. The hydrogen is heated to a temperature of 1100° F. in heater 498 and is passed through hydrogen sweep gas engaging zone 500 into contact with the downwardly moving catalyst bed. A first portion of this hydrogen sweep gas passes upwardly countercurrent to the downflowing catalyst in fourth reaction zone 472, while the second portion passes downward concurrently with the catalyst in fifth reaction zone 474. This second portion and the finally evolved hydrocarbon vapors are disengaged from the catalyst in disengaging zone 502 and are removed therefrom through line 504 controlled by valve 506 to be cooled and partially condensed in cooler 508. A third part of this sweep gas is introduced as a spent catalyst purge gas at the bottom of the reactor via line 497 controlled by valve 499. It passes upwardly to outlet 502. The cooled effluent is passed through line 510 to vapor liquid separating facilities similar to those described. If desired, all of the effluents removed from lines 480, 484, 504 and any others when used may be combined for simultaneous treatment, or each or any combination thereof may be handled separately.

The first portion of sweep hydrogen passes upwardly countercurrent to the catalyst into interheater disengaging zone 512 which is provided with a plurality of relatively long internal sealing legs 514 of restricted cross-sectional area. A minor portion of this hydrogen passes upwardly through sealing legs 514, generates a pressure differential in flowing therethrough which forces the major portion to flow through line 514 into interheater 518 and then back through line 520 into interheater engaging zone 522. Because of the vaporization and desorption of high volatility hydrocarbon from the downwardly moving catalyst and because of the endothermic heat of reaction, the temperature of the catalyst decreases as it passes downwardly through reaction column 216 from zone to zone. During passage of hydrocarbon and hydrogen through interheater 518, it is heated from about 900° F. to about 1100° F. to supply heat to the catalyst passing downwardly from zone 470. One or more of such interheating zones may be employed in a given column, but in any event their structure and operation are analogous to those described immediately above.

The spent deactivated cracking catalyst containing as high as 12–15% carbon by weight is discharged from the bottom of reactor column 216 through outlet line 524 into lower seal vessel 218 provided with steam engaging zone 526. Since the deactivated catalyst is unaffected by steam, the structure of upper seal vessel 214 is not required at this point. A first part of the steam introduced through line 528 at a rate controlled by valve 530, passes upwardly countercurrent to the catalyst, strips residual volatile hydrocarbons in lower stripping zone 532, and is removed with the lower product through line 504. The second part of this stripping steam flows concurrently with the spent catalyst downwardly through line 534 into second induction vessel 220 wherefrom it is conveyed as described before through second conveyance conduit 324 into first solids-fluid disengaging separator 202.

In the event that the reactor is to be operated at a lower pressure than the regenerator, the solids pressuring vessel 208 and its associated equipment is disposed below the reactor in line 524 or 532 and operated as above described.

In the experimental verification of the process of this invention using the reaction and regeneration conditions outlined above with the feed stock defined in Table 1 it was found that an 85% by volume conversion of the feed stock to a gasoline product boiling below about 400° F. may be obtained. The physical properties of the product are as follows:

TABLE 2

*Reactor product characteristics*

| | |
|---|---|
| Gravity, ° API | 50 |
| Boiling range, ° F | 120–410 |
| Weight percent sulfur | 0.3 |
| Knock ratings: | |
|   F–1 clear | 86.0 |
|   F–1+3 | 93.0 |

In a modification of the above described hydroconversion process, the synthetic bead cracking catalyst is impregnated with a substantial amount of chromium, such as between about 10% and about 15% by weight. This catalyst, besides having cracking activity, also actively promotes the hydrocracking of the higher molecular weight hydrocarbons.

With a completely liquid feed and a synthetic bead cracking catalyst the minimum weight ratio of catalyst to oil is about 8.0 under the control conditions previously defined. Usually however feed preheating and/or the presence of vaporizable constituents in the feed permit this ratio to be reduced to as low as about 5.0 and still maintain the liquid hydrocarbon in the conversion zone entirely on the surface and/or in the pores of the solid contact material.

Referring now more particularly to Figure 2 a detailed plan view in cross section of the granular solids indicating device of this invention is shown. Contacting column 550, through which the downwardly moving bed of granular solids passes, is provided with an external housing 552 extending horizontally from the side thereof at a point below the lowest desirable solids level. Housing 552 is provided with flange 554 and blind flange 556 having a seal or gasket 558. In this way access to the elements hereinafter described is permitted. A lever arm 560 extends from a point within column 550 wherein it is connected to the detecting element indicated generally as 562, radially below lever arm housing 564 and into and through housing 552. The detecting element has a shape such that it diverts the solids bed moving past it slightly from a vertical path and thus a reactive deflection of the element is obtained. Conveniently the element is conical with apex upward as indicated in Figure 3. Housing 564 is integrally connected to insert 566 disposed within housing 552 and this insert in turn is integrally connected to the housing by means of connections 568. Lever arm 560 is provided with a pivot 570 which conveniently consists of a knife edge and knife edge block support, the details of which are given in Figures 3 and 4 described below.

Two transverse openings 572 and 574 open from opposite directions into external housing 552. Opening 572 provides access to pivot 570 and is sealed by means of flanges 576 and 578 and pressure seal 580. This opening is provided for the assembly and disassembly of the knife edge pivot. Diametrically opposed is opening 574 consisting of nozzle 582 and flange 584. An outer flange 586 is provided to which is integrally connected a knife edge support tube 588 which extends concentrically through nozzle 582 and terminates immediately below pivot point 570. A seal 590 is provided flanges 584 and 586.

Integrally attached to flange 586 is torque tube housing 592 containing torque tube 594 and torque tube rod 596 substantially coaxially aligned with nozzle 582 and support tube 588. The torque tube and the torque rod are integrally connected together at point 598 and at which a bearing not shown may be disposed. A torque rod extension 600 continues from point 598 and is attached at 602 to lever arm 560. Torque tube 594 is free to rotate with extension rod 600 at point 598 but it is integrally attached to flange 604 so that the outer end is prevented from rotation. Torque rod 596 however is free to move at its outer end and accordingly any angular deflections of lever arm 560 are transmitted through extension 600 and are resisted or balanced by the torsional stresses set up in torque tube 594 and are thus transmitted without other restriction through flange 606. Counterbalance 608 is provided on the outer of arm 560 and is of a material having a density and size such that any degree of reverse deflection of lever arm 560 and torque tube 594 may be obtained at "zero" solids level so as to increase the range of solids level indication and the operating deflections of the rotating elements of the device. Set screw 610 and lock nut 612 are provided in counterbalance 608. The outer end of extension rod 596 is connected by means not shown to a throttling air valve in a pneumatically operated indicating or control instrument, or to a variable impedance in an equivalent electrically operated instrument. This rod may also be connected through a mechanical linkage and used directly as a solids level indicator.

Referring now more particularly to Figure 3, an elevation view in cross section of the device in Figure 2 is shown. Here are indicated additional details of the particular tube of pivotable connection for lever arm 560. In Figure 3 elements previously described in connection with Figure 2 are designated by the same numbers and will not be redescribed. The movable solids detecting element 562 has a generally conical shape with a lower cylindrical skirt section 614 which extends downwardly around vertical end section 616 of lever arm housing 564. Lever arm 560 and counterbalance 608 are shown herein in the normal non-counterbalanced zero solids level position. This position is also representative of an intermediate solids level when the counterbalance 608 is employed. In the counterbalance modification, the positions of counterbalance 608 and lever arm 560 at zero solids level are indicated by broken lines 618 and 620 respectively. The positions of these same elements at high solids level are indicated by broken lines 622 and 624. Thus it is seen that a substantially increased degree of rotation of torque tube rod 596 is obtained.

A side elevation view in this figure is shown of the pivot point designated generally as 570 in Figure 2. The end of knife edge support tube 588 is shown upon which knife edge 626 is supported. As previously described these elements are supported rigidly by means of flange 586 which is bolted against inner flange 584. Bridge block 628 is integrally connected to lever arm 560 around pivot point 630. Integrally attached to the bridge block is knife edge block 632. In this manner indicator element 562, lever arm 560, and counterbalance 608 are all supported through bridge block 628 and knife edge block 632 by knife edge 626, and these elements are free to rotate about pivot point 630 which is the coincidence of the knife edge and the knife edge block. If desired, an optional dust removal conduit 634 may be provided which opens from the bottom of housing 552 at a point immediately below pivot point 630 downwardly back into contacting column 550. Torque tube extension rod 600 not shown extends as shown in Figure 2 at right angles away from knife edge block 632 for connection with the torque tube assembly described above.

Referring now to Figure 4, an enlarged partial cross section view of the knife edge pivot structure is shown looking along the axis of lever arm 560. Knife edge support tube 588 is shown having a portion 636 which extends outwardly beyond the end of the tube 638. Torque tube extension rod 600 is shown which is integrally connected to knife edge block 632 which in turn is supported by bridge block 628. Knife edge 640 is integrally attached at its lower end to extension 636 in the manner shown. Bridge block 628 is integrally connected to lever arms 560 as described above.

An experimental model of the solids level indicating and control device was constructed to control the cracking catalyst level in the process described in connection with Figure 1. As stated above the catalyst temperature was 900° F. and the operating pressure was 400 p. s. i. g. The contacting column was about 14 inches in inside diameter, the solids level detecting element was 3.0 inches in diameter, and was centrally located within the contacting column. The lever arm was 0.5 inch in diameter and was 19.0 inches long with the pivot point disposed 11.0 inches from the vertical axis of the detecting element. The counterbalance employed was a round solid section of stainless steel weighing about 6.94 pounds and being 3.5 inches in diameter and 3.35 inches long. The torque tube was 14.0 inches long, 11/32 of an inch in outside diameter, and was constructed of Inconel. The apparatus described was operated at a maximum over-all deflection of 8 degrees, 4 degrees reverse deflection being provided by the counterbalance. The apparatus thus constructed successfully indicated cracking catalyst levels extending one column diameter above the detecting element and higher within the apparatus described.

The foregoing description given in terms of a specific solids-fluid contacting process in which the present invention has been applied should not be construed as a limitation of the process to the specific temperature and pressure conditions, feed stock, or granular solid contact material described. Although the invention is highly efficient in the conversion of gas oil boiling range hydrocarbons to gasoline boiling range hydrocarbons, the invention has general applicability in the treatment of liquid feeds generally with adsorptive contact material to produce an effluent having a lower boiling range. For example heavy gasolines may be converted to light gasolines boiling below about 300° F. for example, or to even lighter solvents, or to the liquefiable hydrocarbons including propane and butane. The present invention is also applicable under lower pressure conditions to the direct treatment of crude or reduced crude to produce kerosene, gas oils, gas oil fractions suitable for producing jet fuels, diesel fuels, and the like, as well as lighter materials such as light gas oil, the heavy and light gasolines, and the propane and butane fractions.

The present invention has been described with reference to hydrocarbon cracking and coking in the presence of hydrogen. By using a modified catalyst or a physical mixture of two catalysts, simultaneous hydrocarbon conversion processes such as desulfurization, reforming, denitrogenation, and others may be carried on together with the dehydrogenation and cracking process described above.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An apparatus for handling granular solid material which comprises, in combination with a vessel adapted to confine in said vessel a continuous downwardly moving bed of solids, means for introducing and means for removing substantially continuous streams of solids at the top and bottom of said vessel respectively, a detecting element having a small cross section relative to said vessel and disposed within said vessel opposite a point along the wall thereof entirely below the desired solids level, a lever arm connected at one end to said detecting element and extending through the wall of said vessel to a pivotable lever arm support, a torque tube disposed at substantially right angles to said lever arm and connected at its inner end thereto and rigidly anchored at its outer end, a torque rod coaxially disposed within said torque tube and integrally connected thereto at its inner end, the outer and free end of said torque rod being free to rotate through angular deflections in continuous response to equal angular deflections of said lever arm in response to changes in depth of solids above said detecting element.

2. An apparatus according to claim 1 in combination with a controller instrument connected to said torque rod and adapted to be actuated by angular deflections thereon, and solids flow throttling control means associated with said vessel and actuated by said instrument adapted thereby to control the solids flow rate and thereby maintain the solids level in said vessel at a predetermined position above said detecting element.

3. An apparatus according to claim 1 wherein said lever arm is provided with means for applying a counterbalancing force at the opposite end of said lever arm from said detecting element to apply a reverse torsional stress to said torque tube at zero solids level.

4. An apparatus according to claim 3 wherein said means comprises a mass of high density material adjustably disposed on said lever arm.

5. An apparatus for maintaining a level of downwardly moving solid granular material in a vessel which comprises a vertically disposed vessel, a solids inlet and a solids outlet conduit communicating with the top and bottom thereof respectively, a closed external housing opening from the side of said vessel, an elongated lever arm extending from within said vessel outwardly into said external housing, a pivot at an intermediate point on said lever arm, a lever arm housing covering the top of that portion of said lever arm within said vessel, a solids detecting element having a small cross section relative to that of said vessel and connected at the end of said lever arm within said vessel and disposed within said vessel opposite a point along the wall thereof which is entirely below the desired solids level therein so as to be entirely submerged in direct contact with the downwardly moving solids therein, a counterbalance disposed at the other end of said lever arm and within said external housing, a conduit opening from said external housing at right angles to said lever arm, a torque rod integrally connected to said lever arm at the pivot point and disposed coaxially within said conduit, a torque tube coaxially surrounding said torque rod and integrally connected thereto at its inner end nearest said pivot point, a torque tube housing disposed coaxially around said torque tube and which is integrally attached at its outer end to the outer end of said torque tube and at its inner end to the outer end of said conduit thereby preventing rotation of the outer end of said torque tube and providing a pressure tight seal for said housing and vessel, said torque rod being torsionally deflected against a restoring torque generated in said torque tube by angular deflections of said lever arm in response to variations in solids depth above the upper extremity of said detecting element.

6. An apparatus according to claim 5 wherein said pivot comprises in combination a knife edge support tube coaxially surrounding said torque rod and within said conduit integrally attached to the outer end thereof and extending to a point adjacent said lever arm, said support tube being provided with a projection extending beyond said lever arm, a knife edge supported from said projection, a bridge block attached to said lever arm and supporting a knife edge block which engages said knife edge to support said lever arm.

7. An apparatus according to claim 5 wherein said counterbalance is of sufficient weight and disposed along the length of said lever arm so that a torsional stress is generated within said torque tube when there are no solids above said detecting element whereby increasing solids depths reduce the reverse torsional stress to zero at an intermediate solids level and further level increases induce a torsional stress in the opposite direction in said torque tube.

8. An apparatus according to claim 5 in combination with a solids level indicating instrument connected to said torque rod and actuated by torsional deflections thereof to indicate the position of the level of solids bed above said detector element.

9. An apparatus according to claim 5 in combination with a control instrument connected to said torque rod and actuated by the torsional deflections thereof, said instrument being connected to and adapted to actuate a valve in said solids inlet conduit opening into said vessel whereby said solids level is maintained therein at a predetermined position above said detector element.

10. An apparatus according to claim 5 wherein said solids detecting element comprises a conical baffle apex upward and thereby adapted to divert the downwardly moving solids bed and be deflected downwardly through successively greater increments by a solids bed of successively greater depths above said baffle.

11. In an apparatus for contacting a bed of granular solid contact material, having an upper solids level desired at a substantially fixed position opposite a point along the vessel wall, with a fluid under conditions conducive to the formation of heavy semi-solid deposits which adhere to exposed structural surfaces which comprises a contacting vessel, inlet and outlet conduits for solid contact material opening respectively into the top of and from the bottom of said vessel, and separate means for introducing a fluid into and disengaging fluid from contact with said solids in said vessel, an improved solids level indication means which comprises a closed external housing opening from the side of said vessel substantially below said point, an elongated lever arm extending from within said vessel outwardly into said external housing, a pivot at an intermediate point on said lever arm, a lever arm housing covering the top of that portion of said lever arm within said vessel, a solids detecting element connected at the end of said lever arm within said vessel and having a small cross section relative to that of said vessel, said detecting element being located entirely below the desired solids level and said point and entirely submerged in direct contact with the downwardly moving solids therein, a counterbalance disposed at the other end of said lever arm and within said external housing, a conduit opening from said external housing at right angles to said lever arm, a torque rod integrally connected to said lever arm at the pivot point and disposed coaxially within said conduit, a torque tube coaxially surrounding said torque rod and integrally connected thereto at its inner end nearest said pivot point, a torque tube housing disposed coaxially around said torque tube and which is integrally attached at its outer end to the outer end of said torque tube and at its inner end to the outer end of said conduit thereby preventing rotation of the outer end of said torque tube and providing a pressure tight seal for said housing and vessel, said torque rod being torsionally deflected against a restoring torque generated in said torque tube by angular deflections of said lever arm in response to variations in solids depth above the upper extremity of said detecting element.

12. An apparatus according to claim 11 wherein said means for introducing fluid comprises a solid cone spray head disposed in the upper end of said vessel above the level of solids therein and directed downwardly toward said level, and a conduit opening from said spray head out through the wall of said vessel.

13. An apparatus according to claim 12 in combination with a primary conical baffle apex upward disposed just above said spray head and in line below said inlet conduit for solids, a secondary baffle of inverted truncated conical shape spaced slightly below, around, and apart from the lower periphery of said primary baffle, said baffles adapted in combination with said solids inlet conduit to deflect said solids first downwardly and outwardly and then downwardly and inwardly around said spray head and in all directions through the spray issuing therefrom to form a solids bed therebelow having a substantially flat upper surface against which said spray head is directed.

14. An apparatus according to claim 11 in combination with a control instrument connected to said torque rod and actuated by the torsional deflections thereof, said instrument being connected to and adapted to actuate a valve, so as to vary the flow of solids through said vessel and maintain said solids level at a predetermined position above said detection element.

15. An apparatus according to claim 14 wherein said valve is disposed in said outlet conduit for solids opening from the bottom of said vessel.

16. An apparatus according to claim 14 wherein said valve is disposed in said inlet conduit for solids opening into the top of said vessel.

17. An apparatus according to claim 11 in combination with an inclined dust drain conduit communicating the bottom of said external housing with said vessel at a point below said housing.

References Cited in the file of this patent
UNITED STATES PATENTS

| | | |
|---|---|---|
| 460,624 | Zimmerman et al. | Oct. 6, 1861 |
| 2,440,884 | Yglesias-Paz | May 4, 1948 |
| 2,458,162 | Hagerbaumer | Jan. 4, 1949 |
| 2,556,514 | Bergstrom | June 12, 1951 |
| 2,698,544 | Hanssen | Jan. 4, 1955 |